ACOUSTIC APPARATUS AND METHOD FOR ANALYZING SPEECH

Filed Dec. 1, 1961 3 Sheets-Sheet 1

INVENTOR.
HERBERT BELAR

BY Morris A. Rabkin

Attorney

INVENTOR.
HERBERT BELAR
BY Morris L. Rabkin
Attorney

INVENTOR.
HERBERT BELAR
BY Morris L. Rabkin
Attorney

United States Patent Office 3,234,332
Patented Feb. 8, 1966

3,234,332
ACOUSTIC APPARATUS AND METHOD FOR ANALYZING SPEECH

Herbert Belar, Palmyra, N.J., assignor to Radio Corporation of America, a corporation of Delaware Filed Dec. 1, 1961, Ser. No. 156,280
14 Claims. (Cl. 179—1)

This invention relates to acoustic apparatus and methods, and more particularly to apparatus and methods for analyzing sounds of speech.

The invention is especially suitable for use in phonetic typewriters which recognize speech sounds and operate printers to print out alphabetic representations of these sounds. The invention is generally useful in speech and sound recognition equipment for various purposes, such as the conversion of speech into a code for narrow band transmission over a communication link.

A vexing problem in speech analysis is to divide continuous speech into units or segments which are long enough to maintain intelligibility, but short enough so that their number is consistent with the memory capacity of practical information storage devices.

U.S. Patents Nos. 2,971,057 and 2,971,058, issued on February 7, 1961 to Harry F. Olson and Herbert Belar describe equipment for the analysis of speech segments which are about a syllable long. These speech segments may be termed "acoustic syllables." As pointed out in these patents, information corresponding to speech segments of about a syllable may be stored in a memory and printed out in highly intelligible form.

Continuous speech, often spoken without a break, is usually difficult to syllabicate in speech recognition equipment. Attempts to syllabicate speech as directed in a dictionary have been found impractical because speech is not naturally enunciated in the form of dictionary syllables. Moreover, enunciated syllables in normally spoken, connected speech are usually very long as compared to dictionary syllables. Thus, extremely large memory capacity is required in speech recognizing equipment which operates upon continuously spoken, connected speech. It has been found that many sounds, such as sibilant sounds including "s" and "f," and semivowel sounds, including "l," "m," "n" and "r," affect the quality of adjoining sounds. For example, the sound "e" has a different acoustic spectrum in the word "see" than when uttered alone. Similarly, "a" alone and in the word "say" are acoustically different from each other. It is therefore desirable to segment speech into acoustic syllables which are common to a large number of words, but which contain sufficient acoustic information for accurate speech analysis.

Accordingly, it is an object of the present invention to provide improved speech analysis apparatus and methods wherein speech is segmented into units especially suitable for analysis, particularly by acoustic syllable responsive equipment.

It is a further object of this invention to provide improved methods and means for syllabication of speech into acoustic syllables which preserve information as to the context of the speech from which the syllables are derived.

It is a further object of this invention to provide improvements upon the apparatus and methods described in the above-mentioned Patents Nos. 2,971,057, and 2,971,058 which provide for greater accuracy and reliability of operation thereof.

It is a further object of this invention to provide improved speech analysis methods and apparatus by which speech can be segmented into small units without losing context.

The foregoing and other objects of this invention are attained by segmenting continuous speech, which includes connective sounds, such as connective type consonants, which affect the quality of the sounds which precede or succeed them, in an overlapping manner so that the connective sounds are retained at the end and beginning of respective adjacent speech segments.

By a connective sound is meant a connective consonant such as a sibilant or semivowel. In a system embodying the invention, the work "analysis" would, for example, be syllabicated in an overlapping manner as "an-nal-lys-sis" and "many" would be syllabicated "man-ny." The speech segments are relatively short and are common to many words. In such a system, a memory of practical size may be used in the speech recognition equipment.

The invention itself, both as to its organization and method of operation, as well as additional objects and advantages thereof, will become more readily apparent from a reading of the following description in connection with the accompanying drawings, in which.

*General system*

Figure 1:
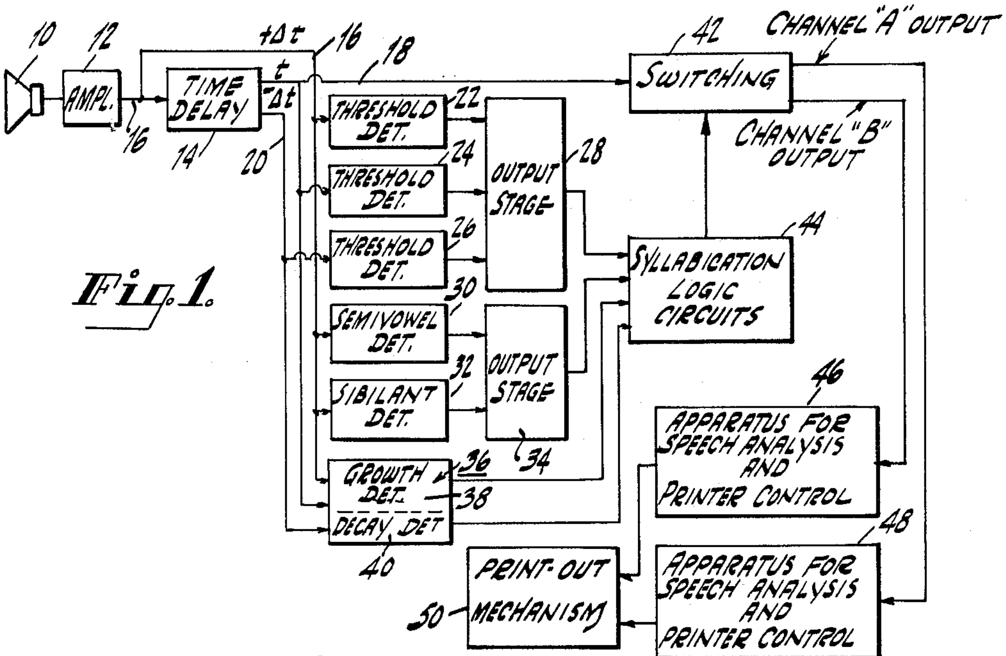
FIG. 1 is a block diagram of speech analysis equipment embodying the present invention.

Referring more particularly to FIG. 1, there is shown a microphone 10 for translating speech sounds into electrical signals. These signals are amplified in an amplifier 12 and applied to apparatus for dividing the speech sounds into acoustic syllables. This apparatus includes a time delay unit 14 of the type wherein delay is obtained by recording the audio signal ountput 16 from the amplifier 12 on a continuous tape loop. The audio signal is played back by two reproducing heads which are spaced from each other. Accordingly, the unit 14 provides two outputs 18 and 20, both corresponding to the audio signal, but having successively greater time delays. The less delayed output 18 of the time delay unit 14 may be considered as a reference signal output. The undelayed output 16 is then relatively ahead of the reference output 18, and the more delayed output 20 is relatively behind the reference output 18.

The syllabication apparatus of the illustrated system includes a plurality of detectors for detecting transitions in speech sounds which are indicative of the termination of a syllable. By a transition is meant a change in the envelope of the speech sound which is characteristic of the termination of a syllable. Examples of a transition are a pause, a semivowel, a sibilant, or a dip or notch in the speech envelope which is characterized by a decay in the sound level immediately followed by a growth in the sound level.

Three threshold detectors 22, 24 and 26 are, respectively, responsive to the outputs 16, 18 and 20. These threshold detectors may be of similar design, and a typical one is shown in greater detail in FIG. 3. A threshold detector emits a signal when the level of the input signal equals or exceeds a selected amplitude designated as the threshold. When the signal is below the threshold level, the threshold detector emits no signal. The purpose of the theshold detectors is to detect the presence of a sound level. The absence of an output from the threshold detector then indicates a stop or pause. The transition from the presence to the absence of output from the detectors 22, 24 and 26, which occurs upon a pause or stop at the termination of a syllable, is used in syllabication logic circuits 44, to control switching circuits 42 for switching the signal output 18 between channel "A" and channel "B" outputs on alternate syllables.

The threshold detectors share a common output stage 28. This output stage may include an output relay and three input relays; one input relay for each of the threshold detectors 22, 24 and 26. Each input relay is operated (actuated) when the audio signal to the input of its corresponding detector falls below a predetermined level. These three input relays are connected to the output relay so as to actuate the output relay when any of the three input threshold detector relays is operated. In other words, the output stage 28 may be a relay circuit for performing the logical "OR" function.

A semivowel detector 30 and a sibilant detector 32 are both connected to the output 16 for detecting semivowel sounds, for example, "l," "m," "n" and "r" or sibilant sounds, such as "s" and "f." The output 16 is used since it is relatively advanced and allows time for operation of the relays associated with the sibilant and semivowel detectors. The semivowel and sibilant detectors 30 and 32 share a common output stage 34 which may be a relay circuit for performing the logical "OR" function. The output stage 34 may include relays individually operated by the semivowel and sibilant detectors which in turn operate an output relay.

A notch detector 36 is provided for the purpose of detecting a dip in the envelope of the audio signal such as represents the ends of a syllable. Examples of such dips in continuous speech are in words like "excursions" between "ex" and "cur" and in words like "meter" between "me" and "ter." The notch detector, shown in greater detail in FIG. 5, includes a growth detector 38 and a decay detector 40. The growth detector is responsive to the advanced output 16 (FIG. 1) and the reference output 18. The decay detector is responsive to the delayed output 20 and the reference output 18. The existence of growth and decay in the signal is obtained by examining the signal level at the relatively advanced and relatively delayed times with respect to the reference time. When both growth and decay exist, a notch is detected.

The reference output 18 is applied to the switching circuits 42. The output of the detectors 22, 24, 26, 30, 32 and 36 control the switching circuits 42 through the syllabication logic circuits 44. The syllabication logic circuits 44 and their controlled switching circuits 42 are shown in greater detail in FIG. 6, as including a plurality of relays which are operated under the control of the various detectors for switching the reference output 18 alternately, between the channel "A" output and the channel "B" output. The syllabication logic circuit 44 is designed to operate in accordance with predetermined rules. These rules are as follows:

(A) Syllabicate by switching from channel "A" to channel "B," or vice versa, at the end of a sound (a pause) or upon a notch.

(B) Syllabicate with overlap during sibilants or semivowels, when a sibilant or semivowel is preceded and followed by a voiced sound (a vowel); i.e., apply the output 18 in parallel to channel "A" and channel "B" upon detection of a sibilant or semivowel so that a sibilant or a semivowel in channel "A" overlaps a sibilant or a semivowel in channel "B."

(C) Syllabicate by switching from channel "A" to channel "B" or vice versa, without overlap at the end of a voiced sound or upon a notch in a voiced sound preceded by a sibilant.

Figure 7:
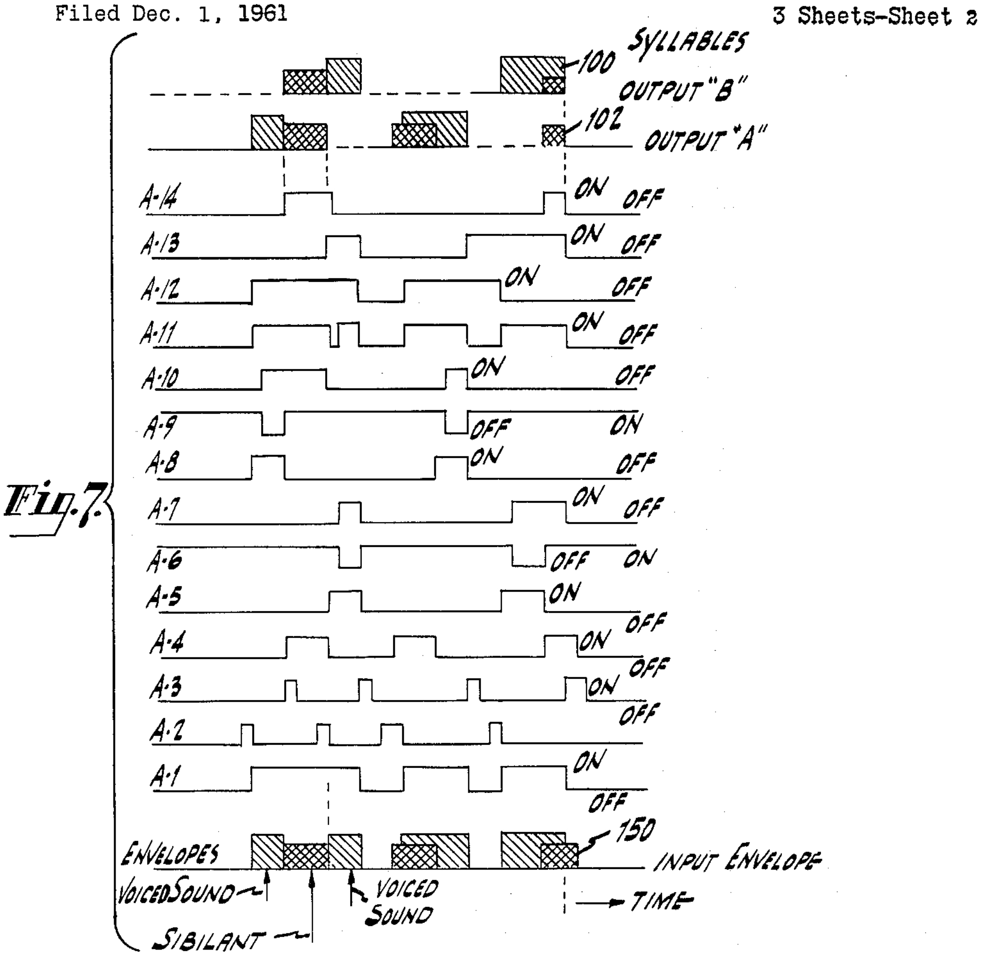
FIG. 7 is a timing chart which illustrates the sequence of operations of the relay logic circuits of FIG. 6.

The channel "A" and channel "B" outputs are shown in waveforms 100 and 102, respectively, in FIG. 7. The presence of voice sounds are illustrated by slant-lined blocks and sibilant or semivowel sounds are illustrated by the cross-lined blocks. It will be noted that the sibilant sound is overlapped in the channel "A" and channel "B" during the sibilant of a voiced sound-sibilant-voice sound sequence. A sequence of a voiced sound preceded by a sibilant is syllabicated without overlapping the sibilant sound and appears only in output "A" in waveform 100. A sibilant voiced sound sequence results in overlapping the sibilant sound in the channel "A" and channel "B" outputs. The sibilant sound appears alone on the channel "A" output. Since the sibilant sounds exists without context it does not represent an acoustic syllable of the type which may be analyzed and recognized in acoustic syllable recognizing apparatus of the above-mentioned Patents Numbers 2,971,057 and 2,971,058. It may be desirable for overlapped output "A" to be blocked during a voiced sound-sibilant sequence so that a sibilant sound appearing by itself on one of the channels may be avoided. A similar analysis may be made for the occurrence of a semivowel with voiced sounds.

The acoustic syllables appearing on channel "A" and channel "B" may be applied respectively to separate apparatus 46 and 48 for speech analysis and printer control which is desirably of the type described in the above-mentioned Patent No. 2,971,058. A common print-out mechanism 50 may be shared between apparatus 46 and the apparatus 48. The read-out of the memories in the apparatus 46 and 48 may control the print-out mechanism 50 so that the print-out mechanism 50 prints out the syllables in the order in which they are sounded. The print-out mechanism may be a typewriter as described in the above-mentioned patents. It may be preferable to use separate spectral memories of the type described in the subject patents for separately storing these syllables from the channel "A" and channel "B" outputs, respectively. Then, a single syllable memory and printer can be operated by alternate ones of the spectral memories, thus reducing the cost of the speech analysis and printer control apparatus used in dual channel analysis over the cost of the system illustrated in FIG. 1.

*Threshold detectors*

Figure 2:
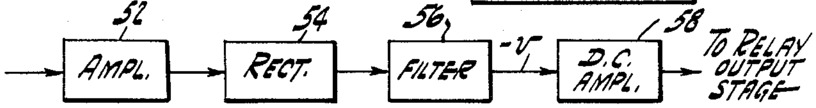
FIG. 2 is a block diagram of a threshold detector included in the system of FIG. 1.

The threshold detector 22 comprises the system of circuits shown in FIG. 2. The signal picked up by the microphone 10 and amplified by the amplifier 12 of FIG. 1 is further amplified by an amplifier 52 (FIG. 2) in the threshold detector. This amplifier 52 may be a multistage A.C. coupled amplifier of usual design which is capable of amplifying in about the same degree the entire audio band. The output of the amplifier 52 is rectified in the rectifier 54 which may be a diode rectifier of known design. The diodes in the rectifier 54 may be polarized to provide a D.C. output which is negative with respect to circuit ground. A smoothing filter 56, such as an R-C filter is used to filter the D.C. output of the rectifier to provide a negatively polarized output indicated as —v. This output is applied to a D.C. amplifier 58. The output of the D.C. amplifier is connected to the operating winding of a relay in the output stage 28 of the threshold detectors (FIG. 1). The D.C. amplifier 58 may be of usual design and causes its associated relay in the output stage 28 of FIG. 1 to operate when a negative voltage equal to or greater than a predetermined magnitude is applied to its input.

The gain of the amplifiers 52 and 58 of FIG. 2 is adjusted so as to develop a voltage at the input of the D.C. amplifier 58 which will cause the relay associated with the D.C. amplifier 58 in output stage 28 of FIG. 1 to operate, when the sounds applied to the microphone 10 exceed a certain threshold level. This adjustment may be made by defining a certain reference level when the microphone 10 responds to normal speech levels. The gain of the amplifiers 52 and 58 (FIG. 1) may then be adjusted so that the threshold for operating the relay associated with the amplifier 58 is a certain percentage (e.g., −30 db) of the reference level.

Since three similar threshold detectors 22, 24 and 26 are used in the system of FIG. 1, each responsive to a differently delayed part of the audio signal, the threshold detectors will provide an output so long as the sound level exceeds the predetermined threshold at any time during the time segment covered by the threshold detectors. Accordingly, a pause, to be detected by the threshold detectors 22, 24 and 26 must be at least as long as the time segment of the audio signal covered by the threshold detectors. This time segment may correspond to the duration of a pause which separates syllables in human speech.

*Semivowel detector*

Figure 3:
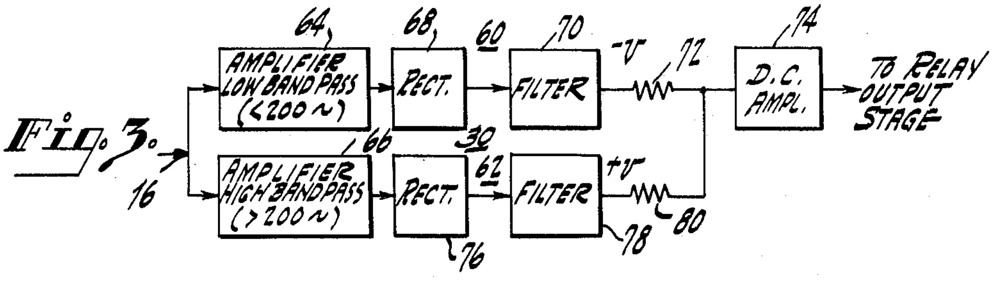
FIG. 3 is a block diagram of a semivowel detector included in the system of FIG. 1.

Referring to FIG. 3, there is shown the system of circuits providing the semivowel detector 30. It is known that semivowels, such as "m," "n," have an acoustic spectrum wherein the greater part of the sound energy is contained in frequency components less than 200 cycles per second. The semivowel detector of FIG. 3 operates by comparing the energy content of low frequency components of a sound with the energy content of the higher frequency components of that sound and provides an output indicative of the presence of a semivowel sound when the relatively greater energy exists in the low frequency components. Two channels 60 and 62, respectively, transmit the low and high frequency components of the audio signal. The advanced output 16 of the delay unit 14 is applied simultaneously to a low band pass amplifier 64 and a high band pass amplifier 66. These amplifiers 64 and 66 may be R-C coupled amplifiers of known design wherein the R-C coupling networks are designed to have a nominal upper cut-off frequency of approximately 200 cycles, in the case of the low band pass amplifier 64, and a nominal lower cut-off frequency of approximately 200 cycles in the case of the high band pass amplifier 66. A rectifier 68 rectifies the output of the low band pass amplifier 64. This rectifier may be of the usual type having diodes polarized to provide a D.C. output which is negative with respect to circuit ground. The D.C. output is filtered in a filter 70 and is applied, by way of an isolating resistor 72, to a D.C. amplifier 74. The D.C. amplifier 74 is similar to the D.C. amplifier 58 (FIG. 2) and is designed to operate a relay associated with the amplifier 74 in the output stage 34 (FIG. 1), when a negative voltage exceeding a certain threshold is applied to the input of the D.C. amplifier 74.

In the other channel 62, which passes the high frequency components of the audio signal from the output 16, a rectifier 76 is used to rectify the output of the high band pass amplifier 66. The rectifier 76 may be similar to the rectifier 68. However, the diodes included in the rectifier 76 are polarized to provide a D.C. output voltage which is positive with respect to circuit ground. The D.C. output of the rectifier 76 is filtered by a filter 78. The output of the filter is a positive voltage indicated as +v. This output voltage is applied through an isolating resistor 80 to the input of the D.C. amplifier 74. The output voltages of opposite polarity from the channels 60 and 62, respectively, are combined across the input resistance of the D.C. amplifier 74. Thus, these outputs are compared with each other. Since the D.C. amplifier responds to a negative voltage that exceeds its threshold, the D.C. amplifier will provide an output when the low frequency channel output voltage is of greater amplitude than the high frequency channel output voltage. Since greater energy in the low frequency channel corresponds to a semivowel sound, the presence of a semivowel sound is indicated by the operation of the relay associated with the D.C. amplifier 74.

*Sibilant detector*

Figure 4:
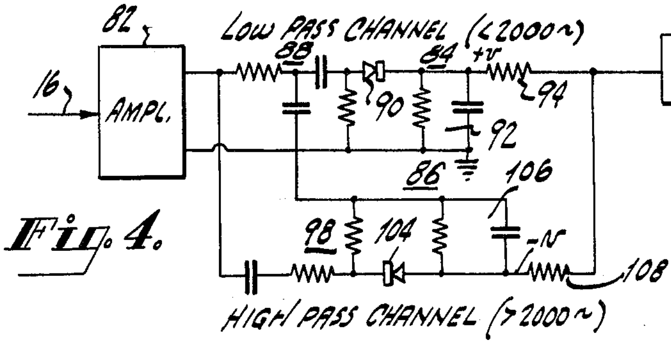
FIG. 4 is a partially block, partially schematic circuit diagram of a sibilant detector which is used in the system of FIG. 1.

The sibilant detector is shown in FIG. 4. A sibilant is a hissing sound wherein most of the acoustic energy is in the high frequency portion of the acoustic spectrum. A sibilant may, therefore, be detected by comparing the relative amounts of acoustic energy in the high frequency components and in the lower frequency components of speech. This is accomplished in the sibilant detector using the advanced output 16 to drive an amplifier 82. This amplifier 82 may be an A.C. amplifier which is designed to pass the entire audio signal. The output of the amplifier 82 is applied to a low pass channel 84 and a high pass channel 86. The low pass channel 84 includes an R–C filter 88 designed to have a high frequency cut-off at approximately 2000 cycles per second. Signal components up to 2000 cycles per second are transmitted to a diode rectifier 90 which is polarized with respect to circuit ground to provide a positive D.C. voltage output +v. An R–C smoothing filter 92 at the output of the diode 90 is used to filter the diode 90 voltage output. This positive voltage output is applied via an isolating resistor 94 to a D.C. amplifier 96. The D.C. amplifier 96 is similar to the D.C. amplifier 58. A relay associated with the D.C. amplifier 96 in output stage 34 (FIG. 1) is operated when a negative voltage of predetermined magnitude is applied to the amplifier 96 of FIG. 4.

The high pass channel 86 includes an R–C filter 98 which is designed in accordance with known techniques to have a low frequency cut-off of approximately 2000 cycles per second. Thus, frequency components of greater than 2000 cycles per second, are passed by the filter 98 and rectified by a diode 104 which is polarized with respect to circuit ground to provide a negative voltage output indicated as −v. The D.C. output of the diode 104 is filtered by an R–C smoothing filter 106 and applied through an isolating resistor 108 to the input of the D.C. amplifier 96. The negative voltage output of the high pass channel 86 is compared with the positive voltage output of the low pass channel 84 by summing these voltage outputs across the input resistance of the D.C. amplifier 96. Since the D.C. amplifier 96 operates its associated relay when the negative voltage input thereto exceeds a predetermined magnitude, the high frequency components of the sound must be greater than the low frequency components thereof to operate the associated relay in output stage 84 of FIG. 1. Since sibilant sounds are characterized by a greater energy in the high frequency portion than in the low frequency portion thereof, the system of FIG. 4 is operative to detect sibilant sounds.

The rules for syllabication are the same for semivowel sounds and sibilant sounds. Accordingly, the semivowel detector of FIG. 3 and the sibilant detector of FIG. 4 share a common output stage (34 in FIG. 1). When either a semivowel or sibilant sound is detected by either the detector 30 of FIG. 3 or the detector 32 of FIG. 4, the output stage 34 of FIG. 1 provides an output which is utilized in the syllabication logic circuits 44.

*Notch detector*

Figure 5:
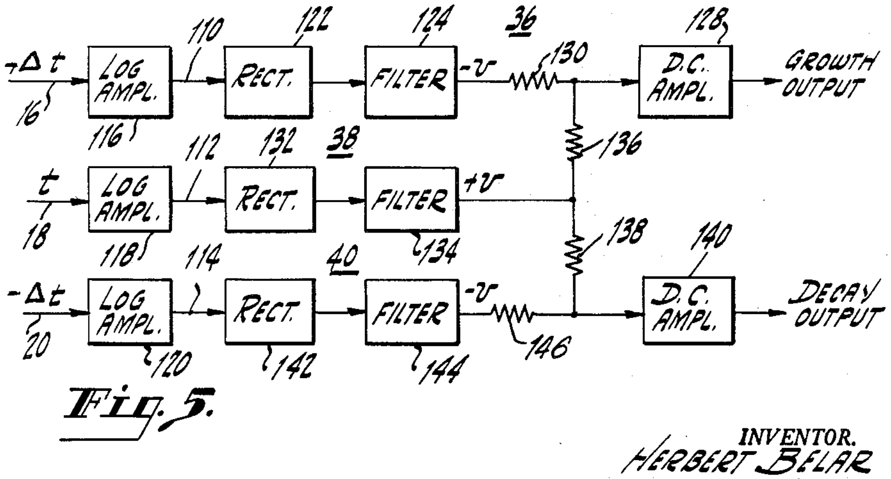
FIG. 5 is a partially block, partially schematic circuit diagram of a notch detector included in the system of FIG. 1.

The notch detector 36 of FIG. 1 is shown in greater detail in FIG. 5. This detector includes the growth detector 38 and the decoyed detector 40 (FIG. 1). The notch detector 36 includes three channels 110, 112 and 114 which are responsive, respectively, to the advanced output 16, the reference output 18 and the delayed output 20 (FIG. 1). The channels 110, 112 and 114 include logarithmic amplifiers 116, 118 and 120, respectively. These amplifiers may be designed in accordance with known techniques to have a transfer characteristic such that the output signal level thereof varies as the logarithm of the input signal level thereto. The amplifiers 116, 118 and 120 are similar to each other and have like transfer characteristics. The use of logarithmic amplifiers prevents large differences in the level of the signals 116, 118 and 120 from affecting proper operation of the growth and decay detectors, while preserving the ratios or relative values of the levels of the input signals upon which the operation of the notch detector is based.

The channel 110 of the growth detector includes a rectifier 122, similar to the rectifiers used in the above-described detectors, which is polarized to provide a D.C. voltage output which is negative with respect to circuit ground. This output voltage is filtered in a filter 124 and applied to the input of a D.C. amplifier 128 through an isolating resistor 130. The D.C. amplifier 128 may be similar to the D.C. amplifier 58. The relay associated therewith in the syllabication logic circuits 44 of FIG. 1 are operated when a negative voltage applied to the input of the amplifier 128 exceeds a predetermined magnitude.

The channel 112 includes a rectifier 132 similar to the rectifier 122, but polarized to provide a positive D.C. voltage output with respect to circuit ground. This voltage output is filtered in a filter 134 and applied through an isolating resistor 136 to the input of the D.C. amplifier 128. The positive voltage output from the filter 134 is also applied through another isolating resistor 138 to the input of another D.C. amplifier 140. Thus, the D.C. amplifier 140 also operates a relay associated therewith, when a negative voltage greater than a predetermined magnitude is applied to the input of the D.C. amplifier 140. The other channel 114 in the decay detector includes a rectifier 142 and a filter 144 similar to the rectifier 122 and filter 124 in the channel 110 of the growth detector 38. The output of the filter 144 is a D.C. voltage which is negative with respect to circuit ground. This D.C. voltage is applied through an isolating resistor 146 to the input of the other D.C. amplifier 140.

In the growth detector 38, the negative voltage corresponding to the advanced output 16 is compared with a positive voltage corresponding to the reference output. Since the D.C. amplifier 128 responds to a negative voltage, a growth output will be provided when the advanced output 16 is greater than the reference output 18. In other words, a positive slope of the audio signal envelope results in a growth output from the D.C. amplifier 128.

The negative output voltage from the channel 114 in the decay detector, corresponding to the delayed input 20, is compared wtih the positive output voltage from the channel 112, corresponding to the reference output 18, since the output voltages are combined across the input resistance of the other D.C. amplifier 140. Thus, when the delayed output 20 is greater than the reference output 18, the D.C. amplifier will provide a decay output. In other words, a negative slope in the envelope of the audio signal operates the D.C. amplifier 140 to produce the decay output. The presence of a growth output and a decay output during the time segment covered by the time delay unit 14 (FIG. 1) is indicative of a dip or notch in the envelope of the audio signal. By using a relay circuit which performs the logical "AND" function in response to inputs corresponding to the growth output and the delay output of the system of FIG. 5, a notch may be indicated. A relay circuit for performing this logical "AND" function is included in the syllabication logic circuits 44 (FIG. 1).

*Switching circuits and syllabication logic circuits*

Figure 6:
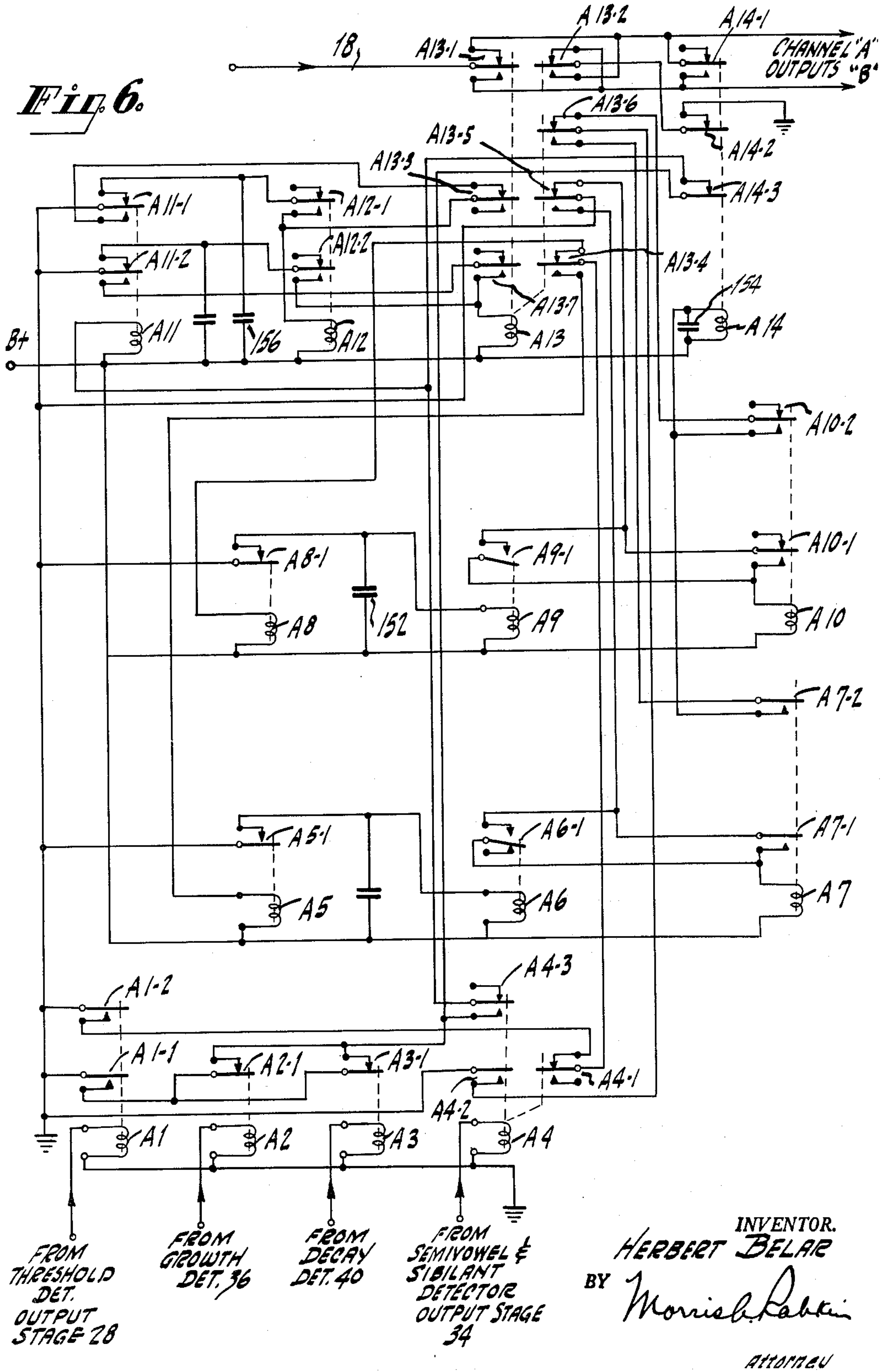
FIG. 6 is a schematic diagram showing relay logic circuits which are used in the system of FIG. 1.

Referring to FIG. 6 there is shown switching circuits 42 and the syllabication logic circuits 44. In the course of the description of FIG. 6, the relays will be identified by the letter A followed by a numeral. The contacts of these relays will be identified by the relay number followed by an additional numeral. For example, A13–1 corresponds to a contact set of the relay A13 and A14–2 corresponds to a contact of the relay A14. The switching circuits 42 and the syllabication logic circuits 44 are interrelated in that the same relays, particularly relays A13 and A14 are common to both the switching circuits and syllabication logic circuits. Each of these relays A13 and A14 have multiple sets of contacts. Contacts A13–1 and A13–2, A14–1 and A14–2 are associated with the switching circuits 42.

The relays of the syllabication logic circuits perform different functions. Relays A11, A12 and A13 constitute a counter circuit for counting successive transitions, such as pauses, notches and sibilants or semivowel sounds, which are detected by the detectors of FIG. 1. Relay A11 is the input relay of the counter circuit and relay A13 is the output relay thereof. Relay A13 performs the switching of the audio signal from the channel "A" output to the channel "B" output, when it is operated. Relays A1, A2, A3 and A4 are responsive to the outputs of the various detector circuits and operate the counter relays A11, A12 and A13. Relays A5, A6 and A7 constitute a logic circuit associated with the channel "B" output. Relays A8, A9 and A10 constitute a logic circuit associated with the channel "A" output. These relay logic circuits carry out the logical operations in accordance with the rules for syllabication which were set forth above. Relay A14 cooperates with relay A13 in switching the audio signal from the reference output 18 between the channel "A" output and the channel "B" output. The relay A14 is operated to perform overlapping syllabication by connecting the channel "A" output and the channel "B" output in parallel to the reference time output 18.

The relay A1 winding is connected to the output stage 28 of the threshold detectors 22, 24 and 26. The relay A2 is operated by the D.C. amplifier 128 of the growth detector (FIG. 5). The relay A3 is operated by the output of the D.C. amplifier 140 in the decay detector (FIG. 5). The output stage 34 (FIG. 1) of the semivowel detector 30 and the sibilant detector 32 operates the relay A4 when either a semivowel or sibilant is detected. Simultaneous operation of the relays A1 and A4 corresponds to the presence of a sound, but not a voiced sound. Thus, the relay A1 operates alone in response to a voiced sound. One of the sides of all of the operating windings of the relays A1, A2, A3 and A4 is connected to ground. The operating winding of relay A1 is connected to a source of operating voltage through a relay contact set of the output relay in the output stage 28. The operating winding of relay A2 is connected to the output relay in the output stage 34. The relays A2 and A3 are associated with the D.C. amplifiers 128 and 140, respectively, and operate when a predetermined negative D.C. voltage is applied to the input of these amplifiers. All of the other relays A5 to A14 of the syllabication logic circuits are energized by a source of operating voltage indicated as B+ which is connected in parallel to one side of each of the relays A5 to A14, inclusive. Operation of any of the relays A5 to A14, inclusive, is obtained by connecting the opposite side of the operating windings thereof to circuit ground.

The operation of the syllabication logic circuits may be explained in connection with the timing chart of FIG. 7. In the timing chart, the various relays A1 to A14, inclusive, are indicated as being on when energized and off when de-energized.

By way of example, the operation of the syllabication logic circuits to a voiced sound-sibilant-voiced sound sequence is set forth below. This sequence is illustrated by the input envelope waveform 150 (last line, FIG. 7). In this waveform a voice sound, such as a vowel sound, is shown by a slant lined area and a sibilant sound is shown by a cross-lined area. It will be appreciated that this form of envelope is not produced in practice but is presented solely for purposes of illustration. A sound sequence characterized by a voiced sound-sibilant-voiced sound sequence may be present when the words "a superior' are spoken as connected speech and particularly in the syllables "a"-"su."

The relays are shown in their initial positions in FIG. 6. All of the relays are de-energized except for the relays A6 and A9. The operating winding of relay A6 is connected through normally closed relay contact A5–1 to ground. The operating winding of relay A9 is connected through normally closed relay contacts A8–1 to ground. Accordingly, the relays A6 and A9 are normally operated.

When the voiced sound of the voiced sound syllable-voiced sound sequence occurs, the relay A1 operates. A circuit is then completed from ground via following relay contacts to energize relay A11: A1–1; A2–1 or A3–1; and A14–3. When relay A11 operates, relay A12 is operated to a circuit from ground to the operating winding thereof through the relay contacts A11–1 and A13–3. The reference output 18 remains connected to the channel "A" output since relays A13 and A14 do not operate. However, the connection of the output 18 to the channel "A" output is registered in the relay logic circuit including the relays A8, A9 and A10. This is accomplished, since the relay A8 is energized through a circuit from ground to the operating winding of the relay A8 through relay contacts A1–2 (now closed), A4–1 and A13–4. Upon the operation of relay A8, its contacts A8–1 open and disconnect ground from the operating winding of relay A9. The previously closed contacts A9–1 open. Ground is connected to relay A10 through contacts A13–5 and A9–1. A holding circuit for relay A10 is completed through its contacts A10–1 which parallel contacts A9–1. Relays A9 and A10 operate only after a predetermined time delay, since a capacitor 152 is connected across the operating winding of relay A9.

Relay A2 operates at the beginning of the envelope (the beginning of the voiced sound). However, this does not affect the operation set forth above since contacts A3–1 parallel contacts A2–1. Since a decay of the envelope does not follow growth thereof within the time segment covered by the delay unit 14 (FIG. 2), both contacts A2–1 and A3–1 do not open together and the relay A11 remains operated for the duration of the first voiced sound.

At the transition between the end of the first voiced sound and the beginning of the sibilant, a decay output is provided by the D.C. amplifier 140 in the decay detector 40. The circuit from ground to the operating winding of the relay A11 remains unbroken because the growth responsive relay A2 becomes de-energized before the decay responsive relay A3 is energized at the transition from the first voice sound to the sibilant.

The relay A1 remains energized, upon occurrence of the sibilant sound. The sibilant sound operates relay A4. Relay A14 is then operated through a circuit including the pulled in contacts A10–2 of the operated relay A10; the relay contacts A13–6 and the relay contacts A4–2. The first counter relay A11 is operated initially through the contacts A14–3. The normally-open contacts of A4–3 are in parallel with the normally-closed contacts of A14–3. When these contacts of A14–3 open due to the operation of the relay A4, the parallel connected contacts A4–3 are still closed to maintain complete the circuit from ground to the operating winding of the relay A11.

The audio signal from the reference output 18 remains connected to the channel "A" output by way of the contacts A13–1 since relay A13 is not operated. Operation of the relay A14 closes its normally open contacts of A14–1 and provides a circuit through contact A13–1 and A14–1 to the channel "B" output. The sibilant sound appears on both the channel "A" output and channel "B" output when the relay A14 is operated, thus providing the beginning of the overlapping syllabication.

The relay A8 drops out when the sibilant responsive relay A14 pulls in since the connection to ground from the operating winding of relay A8 includes the normally closed contacts of now operated relay A4–1. Relay A9 then pulls in actuated by reason of the path through the normally closed contacts A8–1. The operating circuit of the relay A10 includes the contacts A9–1 and its own holding contacts A10–1. Because of these holding contacts A10–1, the relay A10 continues to operate in spite of the drop out of relay A8 upon occurrence of the sibilant sound. The logic circuit including the relays A8, A9 and A10 therefore stores, by operation of the relay A10–1, the information that a voiced sound precedes a sibilant sound. The relay A14 continues to operate through the contacts A10–2, these contacts being closed upon the operation of the relay A10. The relay A14 provides for the overlapping syllabication of the sibilant sounds when it pulls in, as pointed out above. Since operation of relay A14 is predicated upon the operation of relay A10, a voice sound must precede a sibilant sound (or semivowel sound) before an overlapping syllabication takes place. The relay A10 remains pulled in until the relay A13 is operated at the end of the overlapping syllabication.

Operation of the relay A13 takes place upon the next transition from the sibilant sound to the voiced sound in the illustrative voiced sound-sibilant-voiced sound sequence. The transition from the sibilant to the voiced sound is accompanied by operation of the growth detector. Such operation is of no consequence in this illustrative example, since a decay is not detected within the requisite time segment.

The circuit to the first counter relay A11 is temporarily broken to permit the counter to advance one count, when the sibilant sound ends and the relay A4 releases. Relay A14 also releases. However, there is a short intervening period between the release of the relay A4 and the drop out of the relay A14. Relay contacts A4–3 and A14–3 complete the circuit to the relay A11 when the relay A4 is energized and relay A14 is de-energized. Accordingly, it is during the short time between the drop out of the relays A4 and A14 during which the relay A11 releases.

Relay A12 remains energized while the first counter relay A11 is temporarily de-energized. The operating circuits for the second counter relay A12 are provided by two parallel circuits. One of these includes the relay contacts A13–3 which are connected between the operating winding of relay A12 and ground through contacts A11–1. The other parallel circuit includes the relay contacts A12–1 and A11–1. A capacitor 156 slows the release time of the relay A12, when the connection to ground is broken in the relay contacts A11–1. During the voiced sound and the sibilant sound the relay A11–1 and A12–1 are energized. Thus, a circuit is completed through the relay contacts A12–1 and A11–1 to ground from the relay operating winding A12. The relay A12 then tends to release more slowly than the relay A11 at the end of the sibilant sound. The relay A11 is again energized before the relay A12 has time to release. Accordingly, the circuits for energizing the relay A12 will again be completed through its closed contacts A12–1 by way of the contacts A11–1.

The third counter relay A13 is energized while the first counter relay A11 is released and the second counter relay is kept pulled in by its associated capacitor 156. If made before break contacts are used in relay A11, the capacitor 156 may be eliminated. The circuit for energizing the relay A13 extends from its operating winding to ground through relay contacts A12–2 and A11–2. The third counter relay A13 has a connection to ground by way of relay contacts A13–7 and A11–2. This connection keeps the relay A13 pulled in when the second counter relay A12 releases when A13 is energized. It is only upon occurrence of the next transition (upon a pause) that the relay A11 again releases (because relay A1 releases) and the relay A13 releases. Thus, the output 18 is transferred to channel "B" when even counts are registered in the relay counter.

The relay A13 transfers the reference time output 18 from the channel "A" output to the channel "B" output through its relay contacts A13–1, when the relay A13 pulls in. The relay A13 pulls in upon the transition between the sibilant sound and the voiced sound. Thus, the output 18 is connected through the relay contact A13–1 to the channel "B" output. When the relay A14 releases, the paralleling contact A14–1 disconnects the channel "A" output from the channel "B" output. Accordingly, the overlapping syllabication terminates on the start of the last voiced sound. Thus, only the sibilant sound is overlapped.

The contacts A13–2 and A14–2 operate in conjunction with each other to prevent any noise or leakage of output from channel "A" to channel "B" or vice versa when overlapping syllabication does not take place. Ground is connected through the normally closed contacts A14–2 and the contacts A13–2 to the one of the channel "A" or channel "B" outputs which is not carrying the syllable. Thus, when the channel "A" output carries the syllable, ground is connected through contacts A14–2 and A13–2 to the channel "B" output.

Summarizing the operation of the syllabication logic circuits, the relay A13 operates upon the end of every voiced sound (e.g. a vowel), except if that sound is followed by a sibilant or semivowel, or upon occurrence of a notch, to switch the audio signal output from channel "A" to channel "B" or vice versa. The relay A14 provides for overlapping syllabication under the control of either the relay A10 or the relay A7, when a sibilant or semivowel follows a voice sound. The relay A13 transfers control between the logic circuit including the relay A7 or the logic circuit including relay A10 depending upon whether the channel "B" output or the channel "A" output, respectively, carries the audio signal output 18. The operation of the logic circuit including the relays A5, A6 and A7 is the same as the operation of the logic circuit including the relays A8, A9 and A10. The former logic circuit is associated with the channel "B" output whereas the latter logic circuit is associated with the channel "A" output.

*Conclusion*

While a preferred embodiment of a system for syllabicating speech in an overlapping manner has been described, other systems for providing overlapping syllabication may be devised within the scope of the present invention. For example, a spectral memory of the type described in the above-mentioned Patents Nos. 2,971,057 and 2,971,058 may be used having a number of time steps which are sufficiently large to cover the duration of several adjacent syllables. The nature of the sound of each syllable will be apparent from information stored in the memory. Accordingly, a logical system which follows the rules set forth above, may be used to read-out codes representing the successive syllables separately from the memory. Information corresponding to sibilants or semivowel sounds which should be common to successive adjacent syllables may be read-out in an overlapping manner from the spectral memory. It is also within the scope of this invention to syllabicate information stored in a syllable memory of the type described in the above-mentioned patents. The syllable memory may be made large enough to store information as to several successive syllables. Those syllables would include sibilant or semivowel sounds following vowel sounds and may be read-out under the control of the logic circuit associated with the syllable memory, in an overlapping manner.

The foregoing and other variations in the system described herein or in components thereof, such as the various detectors will, of course, be apparent to those skilled in the art. Accordingly, the foregoing description should be taken as illustrative and not in any limiting sense.

What is claimed is:

1. In speech analysis, the method of separating continuous speech segments which comprises the steps of detecting pauses, semivowel sounds, and sibilant sound in said speech, dividing said speech into segments terminating with any one of said pauses, semivowel sounds, and sibilant sounds, and adding to the beginning of the segment which next succeeds any of said segments terminating with any of said semivowel and sibilant sounds the terminating semivowel or sibilant sound of its preceding segment.

2. Apparatus for analyzing continuous speech comprising threshold detection means for detecting pauses in said speech, semivowel detection means, sibilant detection means, notch detection means also for detecting pauses in said speech, said detection means all being responsive to said speech, means operated by said detection means for dividing said sound into segments, and means operated by said semivowel and said sibilant detection means for adding semivowel and sibilant sounds to the end and to the beginning of respective adjacent syllables which are connected by a semivowel sound or a sibilant sound.

3. Apparatus for analyzing continuous speech which comprises means for detecting transitions in said speech including at least one threshold detector, a semivowel detector, a sibilant detector and a notch detector, all of said detectors being responsive to said speech, a pair of output channels, and means controlled by said detectors for switching the transmission of said speech alternately to different ones of said channels when a transition in said speech is detected, said switching means also including means operated by said semivowel and sibilant detectors for switching said sounds simultaneously to both said channels during semivowel and sibilant sounds.

4. Apparatus for recognizing speech sounds, said apparatus comprising means for detecting transitions in the sounds of connective speech during a time segment thereof, said transitions including connective sounds, means responsive to said detecting means for dividing said connective speech during said time segment into acoustic syllables at each of said transitions therein, means responsive to the detection of said connective sounds for including said connective sounds at the beginning and at the end of respective adjacent ones of said acoustic syllables, means for printing out characters representing said syllables, and a pair of syllabication recognizing means respectively responsive to alternate ones of said acoustic syllables for alternately operating said printing means.

5. Apparatus for recognizing speech sounds, said apparatus comprising means for detecting transitions in a time segment of connected speech, said transitions including sibilants and semivowels, a pair of output channels, syllabication means for applying segments of said connected speech alternately to different ones of said channel upon detection of each of said transitions in said sound, means included in said syllabication means and responsive to the detection of each of said sibilant and semivowel sounds for applying said speech simultaneously to both of said channels, an electrically operated print out mechanism, and means included in each of said channels for operating said print out mechanism alternately in response to said speech segments applied to respective ones of said channels.

6. Apparatus for recognizing speech sounds, said apparatus comprising:

(a) means for translating said sounds into a first electrical signal;

(b) means for delaying said first signal for at least two time periods of different duration for providing second and third signals corresponding to said first signal and each having a greater time delay than said first signal;

(c) first, second and third threshold detecting means responsive respectively to said first, second and third signals for providing an output so long as the level of said first, second or third signals is above a certain threshold;
(d) semivowel and sibilant detecting means responsive to said first signal for providing an output when said first signal corresponds to a semivowel or sibilant sound;
(e) growth detection means responsive to said first and second signals for providing an output when the level of said speech sound increases;
(f) decay detecting means responsive to said second and third signals for providing an output when said speech sound level decreases;
(g) first and second output channels;
(h) switching means for connecting said second signal to a selected one or both of said output channels;
(i) syllabication means responsive to said output from said detecting means for operating said switching means to connect said second signal alternately to different ones of said output channels upon occurrence of the absence of said output from said threshold detecting means in response to substantial simultaneous outputs from both said growth detecting means and said decay detecting means;
(j) means included in said syllabication means responsive to said output from said semivowel and sibilant detecting means for operating said switching means to connect said second signal simultaneously to both said output channels for the duration of said output from said semivowel or sibilant detecting means;
(k) a print-out mechanism; and
(l) different means in each of said channels for analyzing acoustic syllables and for alternately operating said print-out mechanism.

7. In speech analyzing apparatus wherein speech signals corresponding to sounds of speech are provided, semivowel detecting means including high pass and low pass filter means responsive to said speech signals for dividing said signals having frequency components greater than a predetermined frequency into a first channel and having frequency components of less than said predetermined frequency into a second channel, and means responsive to the relative magnitudes of the signals in said first and second channels for providing an output when the signals in said second channel exceed the signals in said first channel whereby semi-vowels of the nature of "l," "m," "n," and "r" are detected.

8. In speech analyzing apparatus wherein speech signals corresponding to sounds of speech are provided, a sibilant detecting means comprising a low pass filter and a high pass filter for separating said signals respectively into a first and a second channel, and means responsive to the relative magnitudes of the signals transmitted by said first and said second channels for providing an output when said signals transmitted by said second channel have levels exceeding the levels of signals transmitted by said first channel whereby sibilants of the nature of "f" and "s" are detected.

9. In speech analyzing apparatus wherein speech signals corresponding to sounds of speech are provided, means for detecting a notch in the envelope of said speech signals comprising means responsive to said speech signals for providing three outputs having respectively different time delays, the first of said outputs corresponding to said speech signal, the second of said outputs corresponding to said speech signal having a first time delay, the third of said outputs corresponding to said speech signal having a time delay greater than said signal of said second output, three channels each for transmitting a different one of said first, second and third outputs, said channels each including separate logarithmic amplifiers for amplifying their respective said outputs and means included in each of said channels responsive to the outputs of said logarithmic amplifiers for providing direct current voltages corresponding thereto, means responsive to the relative magnitudes of the direct current voltages transmitted by said first and said second channels for providing a signal growth output when the direct current voltage from said first channel exceeds the direct current voltage from said second channel, means responsive to the relative magnitudes of the direct current voltages from said third and said second channels for providing a signal decay output when the direct current voltage from said third channel exceeds the direct current voltage from said second channel, and means responsive to the simultaneous presence of said growth output and said decay output for providing an output corresponding to a notch in said level of the envelope of said speech signals.

10. Apparatus for syllabicating continuous speech comprising first detecting means for detecting voiced sounds in said speech and for detecting pauses and notches in said voiced sounds, second detecting means for detecting sibilant or semivowel sounds in said speech, a pair of output channels for transmitting said speech, and means responsive to said first and second detecting means for applying said speech
(a) alternately to one and the other of said output channels upon detection of any of a pause or a notch in said voiced sound; and
(b) simultaneously to both said pair of output channels during detection of any of said sibilant and semivowel sounds which are preceded by said voiced sounds, whereby said channels alternately transmit successive acoustic syllables of said speech.

11. Apparatus for syllabicating continuous speech which comprises speech detection means providing an output indicating the absence and presence of said speech, a counter circuit responsive to said speech detection means output for counting transitions from the presence to the absence of said speech, a pair of output channels, and means controlled by said counter circuit for transferring said speech to one of said channels when one of an odd and even count is registered in said counter circuit and to the other of said channels when the other of said odd and even count is registered in said counter circuit.

12. Apparatus for syllabicating continuous speech which comprises speech detection means providing an output indicating the absence and presence of said speech, means responsive to said speech providing an output indicative of a connective sound therein, a counter circuit responsive to said speech detection means output for counting transitions from the presence to the absence of said speech, a pair of output channels, means controlled by said counter circuit for transferring said speech to one of said channels when one of an odd and even count is registered in said counter circuit and to the other of said channels when the other of said odd and even count is registered in said counter circuit, and means for registering a count in said counter circuit in response to a connective sound preceded by said speech detecting means output indicative of the presence of a sound.

13. Apparatus for syllabicating continuous speech signals which comprises speech detection means providing an output indicating the absence and presence of speech, means responsive to said speech for providing an output indicative of the presence of sibilant or semivowel sounds, first and second output channels, first energizable switching means for transferring said speech signals from said first output to said second output when energized, second energizable switching means for connecting said speech output simultaneously to said first and said second outputs when energized, an energization circuit for said second switching means including a memory device having storage for an output, said device completing said energization circuit when an output is stored therein, means for storing said speech detection means output in said memory device, and means responsive to the output of said sibilant or semivowel detection means for completing said energization circuit, whereby alternate signals from said first and said second channel outputs correspond to successive ones of said syllables and whereby syllables terminating with sibilants or semivowels are syllabicated in an overlapping manner.

14. Apparatus for syllabicating continuous speech which comprises means for translating said speech into speech signals, speech detection means providing an output indicating the absence and presence of speech of greater than a predetermined level, means responsive to said speech for providing an output indicative of the presence of sibilant or semivowel sounds, a relay counter circuit including at least three relays connected to each other so that the third of said three relays is energized upon alternate energization of the first of the three relays, first and second output channels, means including at least one contact of said third relay for transferring said speech signals from said first output to said second output when said third relay is energized, a fourth relay having a plurality of contacts, means including at least one of the contacts of said fourth relay for connecting said speech output simultaneously to said first and said second outputs when said fourth relay is energized, an energization circuit for said fourth relay including a memory relay for completing said fourth relay energization circuit when said memory circuit is energized, means responsive to said speech detection means output for energizing said memory relay and said first relay, and means responsive to the output of said sibilant or semivowel detection means for operating said fourth relay through said energization circuit therefor, whereby alternate signals from said first and said second channel outputs correspond to successive ones of said syllables and whereby syllables terminating with sibilants or semivowels are syllabicated in an overlapping manner.

References Cited by the Examiner

UNITED STATES PATENTS

| | | | |
|---|---|---|---|
| 2,705,260 | 3/1955 | Kalfaian | 179—1 |
| 2,851,661 | 9/1958 | Buland | 179—1 |
| 2,866,001 | 12/1958 | Smith | 179—1 |
| 2,938,079 | 5/1960 | Flanagan | 179—1 |
| 3,067,288 | 12/1962 | Kalfaian | 179—1 |

ROBERT H. ROSE, *Primary Examiner.*

WILLIAM C. COOPER, STEPHEN W. CAPELLI, *Examiners.*